United States Patent [19]

Chen

[11] Patent Number: 4,935,576
[45] Date of Patent: Jun. 19, 1990

[54] POLYBUTENE PROCESS

[75] Inventor: Frank J. Chen, Edison, N.J.

[73] Assignee: Exxon Chemical Patents Inc., Linden, N.J.

[21] Appl. No.: 276,135

[22] Filed: Nov. 25, 1988

[51] Int. Cl.$^5$ ................................ C07C 2/02
[52] U.S. Cl. ....................... 585/522; 585/532
[58] Field of Search ...................... 585/522, 532

[56] References Cited

U.S. PATENT DOCUMENTS

| | | | |
|---|---|---|---|
| 2,957,930 | 10/1960 | Jackson | 260/683.15 |
| 3,119,884 | 1/1964 | Allen et al. | 260/683.15 |
| 3,200,169 | 8/1965 | Nichols | 260/683.15 |
| 3,200,170 | 8/1965 | Nichols | 260/683.15 |
| 3,501,551 | 3/1970 | Heidler et al. | 260/683.15 |
| 3,639,661 | 2/1972 | Marek et al. | 260/94.3 |
| 3,985,822 | 10/1976 | Watson | 260/683.15 |
| 3,991,129 | 11/1976 | Daniels | 260/683.15 |
| 3,997,129 | 12/1976 | Ban et al. | 242/201 |
| 4,465,887 | 8/1984 | Schammel | 585/517 |
| 4,558,170 | 12/1985 | Chen et al. | 585/532 |

FOREIGN PATENT DOCUMENTS

| | | |
|---|---|---|
| 731006 | 9/1969 | Belgium . |
| 1195760 | 6/1970 | United Kingdom . |
| 1449840 | 9/1976 | United Kingdom . |
| 2001662A | 2/1979 | United Kingdom . |

*Primary Examiner*—Curtis R. Davis
*Attorney, Agent, or Firm*—J. B. Murray, Jr.; M. B. Kapustij

[57] ABSTRACT

Polybutene is prepared from a mixed $C_4$ hydrocarbon feedstream using an organo-aluminum/HCl catalyst system wherein the HCl is introduced separately into the feedstream to form organochloride in the feedstream. Polybutene product having a very narrow molecular weight distribution is obtained over the $M_n$ range of 700 to 3,000. Dispersants derived from this polybutene exhibit substantially improved performance in lubricating oil compositions.

36 Claims, 1 Drawing Sheet

POLYBUTENE PROCESS

CROSS-REFERENCE TO RELATED APPLICATION

This application is related to my co-pending applications Ser. No. 262,919, filed Oct. 26, 1988, and Ser. No. 262,918, filed Oct. 26, 1988.

BACKGROUND OF THE INVENTION

1. FIELD OF THE INVENTION

This invention relates to the polymerization of isobutylene-containing feedstreams and, more particularly, this invention relates to the production of polybutenes from a mixed $C_4$ feedstream utilizing an organoaluminum chloride-hydrogen chloride co-catalyst system.

2. DESCRIPTION OF PRIOR ART

The production of isobutylene polymers from mixed $C_4$ hydrocarbon feedstreams is generally known in the art. It is also known to utilize $AlCl_3$ as the polymerization catalyst in such processes and the prior art discloses a number of co-catalyst or catalyst promoters, including hydrogen chloride for use under various conditions in isobutylene polymerization.

Representative disclosures include U.S. Pat. No. 2,957,930 which shows the use of 10 to 20% $AlCl_3$ catalyst in the production of polyisobutylene from a $C_1$ to $C_5$ petroleum gas feedstock with 0.08 to 0.12 percent HCl, relative to $AlCl_3$, used as a catalyst promoter. This reference notes that correspondingly small quantities of water vapor or chloroform, which can react with $AlCl_3$ to release HCl, may also be used. British Pat. No. 1,195,760 (1970) discloses the production of olefin polymers by polymerization in the presence of the catalyst comprising a liquid complex of $AlCl_3$, HCl and an alkyl benzene. Polymerization products include materials other than polyisobutylene and products with a narrow molecular weight distribution are disclosed in this reference.

U.S. Pat. No. 3,349,065 relates to a process for forming butyl rubber from feedstreams comprising isobutylene and isoprene, employing a catalyst system or dialkyl aluminum halide—hydrogen halide catalyst system. The patent illustrates the addition of HCl to the monomer feed before addition of diethyl aluminum chloride in several examples (e.g., Example 8, run V).

U.S. Pat. No. 3,119,884 discloses a series of vertical column reactors useful for polymerizing isobutylene and further discloses a catalyst comprising $AlCl_3$ and HCl or a substance which generates HCl. The catalyst system is described as an acid promoted $AlCl_3$ catalyst. In such a system, a reaction between HCl and $AlCl_3$ occurs to form $H+AlCl_4-$ which is the species that initiates polymerization. According to this process, one method of introducing catalysts and reactants is to have the three materials, i.e., $AlCl_3$, HCl and liquid feed, enter the reactor through the same duct. This necessarily results in polymerization beginning in the duct line in an exothermic reaction and the reaction is not controlled by the refrigeration system of the reactor. Any product formed under these conditions will have an undesirable low molecular weight and broad molecular weight distribution.

U.S. Pat. Nos. 3,200,169 and 3,200,170 deal with the reaction mixture separation methods after polymerization of propylene or butylene feeds utilizing an ammonia treatment process. HCl is disclosed in the references as a suitable catalyst promoter added to the reaction zone which contains an $AlCl_3$ catalyst.

U.S. Pat. No. 3,501,551 is directed to a process for producing normal butene polymers at molecular weights of from about 200–750 wherein a $C_{3-5}$ hydrocarbon mixture containing isobutylene and normal butylenes as substantially the only olefins present are reacted in liquid phase with an aluminum chloride catalyst to form a reaction mixture containing only isobutylene polymers. The isobutylene polymers are separated and thereafter the resulting reaction mixture is treated with a Friedel-Crafts catalyst to form a second reaction mixture containing normal butylene polymers. The aluminum chloride in the first polymerization section is indicated to be added alone or in combination with promoters, such as alkyl chloride, e.g., isopropyl chloride.

U.S. Pat. No. 3,639,661 relates to processes for polymerization of isobutylene employing as polymerization catalysts either a reaction product of titanium tetrafluoride with a chlorine bearing Friedel-Crafts catalyst which is soluble in isobutylene or a reaction product of titanium tetrachloride or boron trichloride with a fluorine bearing compound whose fluorine atoms are capable of partly replacing chlorine atoms in the titanium tetrachloride or boron tetrachloride. It is indicated that the catalyst can be made in situ by adding the catalyst components separately to the reaction medium.

U.S. Pat. No. 3,991,129 relates to the production of polybutene employing recycled reaction liquid, liquefied butenes and Friedel-Crafts catalyst, which is stated to be preferably aluminum chloride promoted with hydrochloric acid gas or its water equivalent. The catalyst is admixed with the recycle and fresh feed lines upstream of a static mixer prior to charging to the polymerization reaction column.

U.S. Pat. No. 3,932,371 relates to a process for preparing low bulk viscosity polymers comprising copolymers of isoolefins and conjugated diolefins, e.g., isobutene—isoprene mixtures, as in the preparation of butyl rubber, employing an ethyl aluminum dichloride catalyst optionally promoted with hydrogen chloride or a $C_3$ to $C_7$ organic halide compound. Hydrogen chloride is disclosed as a promoter which can comprise from 0.1 to 50 wt. % of the total catalyst system. In Example 2, benzoyl chloride promoter is added to an isobutylene-isoprene monomer mixture which is then contacted with ethyl aluminum dichloride (EADC) in a continuous reactor.

U.S. Pat. No. 3,985,822 relates to the production of poly-n-butenes by use of $AlCl_3$ promoted with HCl but the objective is to reduce the isobutylene content of the polymer product.

U.S. Pat. No. 3,997,129 discloses polybutylenes from a $C_1$ to $C_5$ liquefied refinery stream wherein the catalyst is solid particles of $AlCl_3$ promoted with HCl gas or its equivalent. This process employs a static mixer for mixing catalysts and feed prior to conducting polymerization.

U.S. Pat. Nos. 4,038,474 and 4,039,733 each relate to ethyl aluminum dichloride—HCl catalyzed processes for preparing polymers from a $C_4$ olefin-styrene monomer mixture, which in '474 contains at least 20% styrene and which in '733 contains divinyl benzene for partial crosslinking. Examples 4, 5 and 6 of '474 describe procedures in which the $C_4$ olefin-styrene monomers are first blended with HCl and a hydrocarbon solvent, and then treated with EADC to effect polymerization.

U.S. Pat. No. 4,465,887 relates to a process for producing butylene polymers having molecular weights of from about 400–5,000 wherein the feedstream containing mixed butenes is fractionated to remove recited amounts of cis-2-butene. The overhead fraction from the fractionating step contains isobutylene and is reacted in the presence of an aluminum chloride catalyst to polymerize the isobutylene and to form a reaction mixture consisting of isobutylene polymers and unreaction hydrocarbons including normal butenes. This reaction mixture is flashed distilled or recover the isobutylene polymers and the unreacted hydrocarbon mixture is then reacted in a presence of a catalyst system consisting of aluminum chloride and a promoter to polymerize butylenes in the fraction and form in a second reaction product mixture containing butylene polymers having lower molecule weights, e.g., of from 400–900 molecular weight. The patent indicates that a promoter is essential of a second polymerization reaction, and indicates that typical promoters are isopropyl chloride, t-butyl chloride, water and hydrogen chloride. The patent's promoters are added to the reactor separately from the aluminum chloride and the first hydrocarbon reaction mixture containing the unreacted normal butene.

U.S. Pat. No. 4,558,170 is directed to a process for preparation of polyisobutylene from a mixed $C_4$ hydrocarbon feedstream using an $AlCl_3$—HCl catalyst system wherein the HCl is introduced separately into the feedstream, prior to contacting the feedstream with the $AlCl_3$, to form organochloride in the feedstream, e.g., the t-butylchloride is formed by reaction of the HCl with the feedstream's isobutylene.

Belgium Pat. No. 731,006 relates to the alkylation of aromatic hydrocarbons using n-butene polymers, wherein the polymers are produced from a refiner stream containing n-butene basically free from isobutylene which are polymerized in the presence of aluminum chloride.

European Pat. No. 115,635 relates to a continuous process for producing polyisobutylene from isobutylene feeds, wherein solvents and monomer vaporized during the polymerization are recycled after liquefaction to the polymerization zone.

U.K. Pat. No. 1,449,840 describes a process for alkylating benzene, wherein benzene is contacted with a polybutene in the presence of aluminum chloride. The polybutene itself is prepared by polymerizing a mixed $C_4$ feedstock containing from 2–20 wt. % of isobutene. The polybutenes are stated to be prepared by conventional polymerization process using a Friedel-Crafts catalyst such as aluminum chloride.

U.K. patent application 2,001,662A relates to the preparation of polybutene by polymerization of a $C_4$ olefin stream over a fixed bed catalyst comprising a Lewis acid chloride ($AlCl_3$ being illustrated) intercalated with graphite, with HCl being added optionally as a promoter. The patent discloses that the HCl may be added to the monomer feed before it contacts the catalyst bed.

SUMMARY OF THE PRESENT INVENTION

The present invention is considered distinguished from the foregoing references in that it produces a polybutene which is especially suitable as the oil soluble hydrocarbon component of a lubricating oil dispersant based upon the reaction of polyisobutenyl succinic anhydride with compounds such as ethylene polyamines and polyols. Polybutene produced in this invention are characterized by a narrow molecular weight distribution in the dispersant molecular weight range, that is, a number average molecular weight ($\overline{M}_n$) of about 700 to 3,000. Molecular weight distribution is used here in its normal sense as a measure of the breadth of molecular weight distribution and is defined as the ratio of $\overline{M}_w$ (weight average molecular weight) to $\overline{M}_n$ (number average molecular weight). This narrow molecular weight distribution results in a product having a relatively lower viscosity than polybutenes produced in heretofore conventional processes in the same molecular weight range. The process is especially characterized in the technique of addition of HCl co-catalyst to the feedstream prior to the feedstream entering the reactor. Other methods of providing HCl which the prior art considers suitable, i.e., such as adding HCl to the reactor itself, adding water or other HCl-generating reagents or adding HCl to ethyl-aluminum dichloride (EADC) prior to initiation of polymerization are not suitable in this invention and do not provide the degree of process control and product quality achieved herein.

In particular, it has been surprisingly found that the use of organo-aluminum chloride catalyst, instead of $AlCl_3$ as described in U.S. Pat. No. 4,558,170, in combination with HCl pre-addition to the monomers, provides a polybutene of still further narrowed molecular weight distribution, higher catalyst efficiency, higher monomer conversion, and decreased light ends by-product make, as compared to product obtained in use of $H_2O/AlCl_3$ or $H_2O/EADC$ as a promoter/catalyst system.

BRIEF DESCRIPTION OF THE ACCOMPANYING DRAWING

FIG. 1 is a schemmatic illustration of embodiment of the process the present invention.

DETAILED DESCRIPTION OF THE INVENTION

Figure 1:
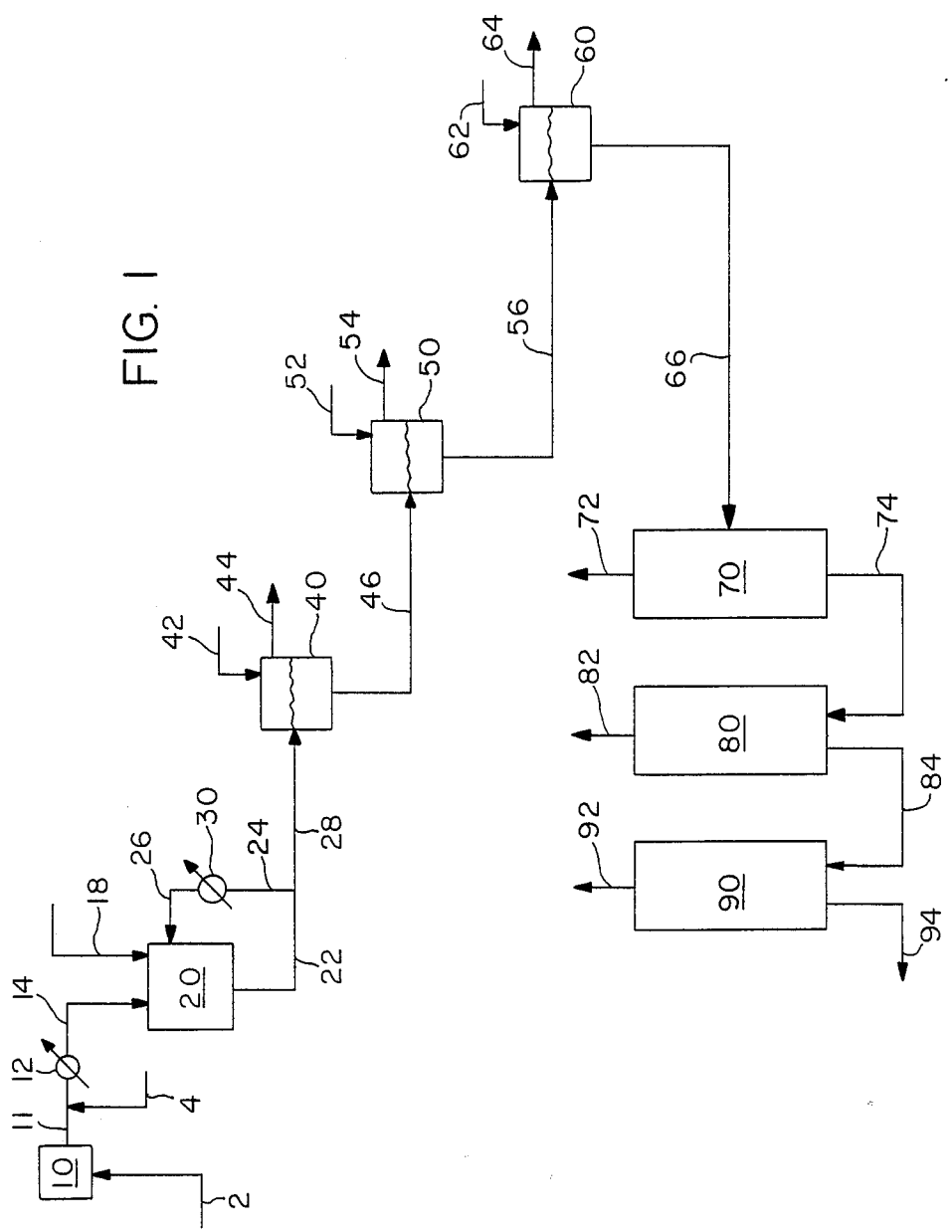

In accordance with the present invention there has been discovered a process for preparing low molecular weight polybutene having an $\overline{M}_n$ in the range of about 700 to about 3,000 (and preferably from about 900 to 2,500), and a molecular weight distribution less than about 2.0 from a feedstream mixture of $C_4$ hydrocarbons containing at least about 6% by weight isobutylene in a stirred reaction zone maintained at a temperature of about $-50°$ C. to $+30°$ C., which comprises: (a) injecting HCl into the feedstream mixture in an amount of from about 25 to 200 parts by weight per one million parts by weight of the feedstream mixture, in the substantial absence of the organo-aluminum catalyst and under conditions sufficient to substantially completely react the injected HCl with feedstream monomers, thereby producing a treated feedstream mixture which contains not greater than about 1.0 ppm free HCl; (b) introducing the treated feedstream mixture and the organo-aluminum chloride catalyst as separate streams into the reaction zone; (c) contacting the introduced treated feedstream mixture and the introduced catalyst in the reaction zone for a time and under conditions sufficient to form a polymerization reaction mixture containing the polybutene; (d) withdrawing the polymerization reaction mixture from the reaction zone; and (e) recovering the polybutene product from said withdrawn polymerization reaction mixture. The polybutenes can be recovered from the reaction mixture by quenching the withdrawn reaction mixture with aqueous alkali and separating therefrom polybutenes product, which can then be stripped of unreacted $C_4$ hydrocarbons and polybutenes below $\overline{M}_n$ of 300 sufficiently to provide less than 25 wt. % polybutene below $\overline{M}_n$ of 500 in the final product.

The feedstock for the process of this invention comprises a mixture of pressure liquefied $C_4$ hydrocarbons (such as catalytic cracked $C_4$ or steam cracked $C_4$ fractions) which comprise at least about 6%, up to about 50% isobutylene together with butene-1, cis- and trans-butene-2, n-butane, isobutane and less than about 1% butadiene. The preferred $C_4$ feedstream is derived from refinery catalytic or steam cracking and contains from about 6-45% by weight isobutylene, from about 25-35% saturated butanes and from about 15-50% 1- and 2-butenes. The $C_4$ products other than isobutylene function as the reaction medium and are a non-critical aspect of this invention. The isobutylene content of the feedstock should not however fall below about 5 wt. % of the feedstream.

The $C_4$ feedstream preferably is substantially free of $H_2$ and sulfur contaminants (e.g., mercaptans), e.g. <20 wppm $H_2$ and <5 wppm S. Such low levels of free $H_2$ minimize the degree of saturation in the polybutene products of this invention, and the low S levels are desired to avoid undesired side-reactions with the monomer, polymer and catalyst components, and to avoid the need to resort to added expense and technical difficulties in removing the sulfur contaminants from the polymers thereby formed. Further, the $C_4$ feedstream is preferably substantially anhydrous, that it, contains less than about 0.05 wt% water, more preferably less than about 300 wppm water, based on the $C_4$ monomers in the feedstream. It has been found that water, which can be typically present in catalytically cracked or steam cracked $C_4$ streams, is not an effective co-catalyst in the manufacture of the polybutene polymers of the present invention employing the organo-aluminum catalyst/HCl pre-reacted cocatalyst systems in the present invention. Rather, such excess amounts of water are undesired due to side-reactions of the water with the organo-aluminum catalyst which decrease the effective catalyst concentration in the reactor, and do not offer any offsetting enhancement in the rate of polymerization or in any observed polymer performance property.

The drying of the $C_4$ feed stream can be accomplished by contacting the stream with a dessicant which is substantially nonreactive with any organic component of the stream, such as $CaCl_2$, molecular sieves (e.g., mol sieves 3A and 13X from Linde Division, Union Carbide), and the like. The drying of the feedstream can be effected in one or more vessels containing a solid dessicant through which $C_4$ feedstream is passed, and usefully can comprise a series of separate vessels arranged in parallel to facilitate the charging to any vessel of fresh dessicant in the continuous practice of the process of this invention.

The $C_4$ feedstream is maintained at a sufficient pressure to be in liquid form both in the reactor inlet and in the reaction mixture itself at the reaction temperature, which is generally from about $-50°$ C. to $+30°$ C., conventional cooling means (e.g., providing cooling coils within the reactor; cooling the external surfaces of the reactor; withdrawing a portion of the reaction mixture from the reaction zone to an external cooler and recycling it to the reaction zone; etc.) being used to maintain the reaction at these temperatures in view of the exothermic nature of the reaction. Preferred reaction temperatures are from about $-15°$ C. to $+15°$ C. and most preferred from about $-5°$ C. to $+15°$ C. Generally, relatively higher temperatures tend to produce relatively low molecular weight polymer. Reaction pressures are generally from about 100 to 600 kPa, and more typically from about 200 to 400 kPa.

The process of the present invention employs either a tubular reactor or a stirred reactor (preferably a continuous type stirred reactor) having two separate inlet means for introduction of $C_4$ feedstream and the organo-aluminum chloride catalyst, the latter being added alone or in admixture with a diluent or solvent which is substantially inert under the premixing and polymerization conditions. Useful diluents include liquid saturated hydrocarbons, such as n-butane, isobutane or mixtures of saturated butanes.

The feedstream inlet means (e.g., a conduit) is fitted with a device for injection (preferably for continuous injection) of HCl (preferably gaseous HCl) co-catalyst into the $C_4$ feedstream at a point prior to reactor entry. The HCl injection point should be placed in the $C_4$ feedstream sufficiently in advance of the reactor entry to permit substantially complete reaction of the HCl in the feedstream with 1- and 2-butenes prior to the polymerization reaction zone. The HCl is believed to react with the isobutylene to form t-butyl chloride in the resulting treated feedstream mixture. Other organo chlorides can also be formed, principally a 2-chlorobutane from reaction with the 1- and 2-butenes of the monomer feedstream. The concentration of free HCl in the treated feedstream mixture at the point of reactor entry should therefore be not greater than about 1.0 ppm (parts per million) or less in order to achieve the advantage of the invention. The concentration of the HCl can be determined by conventional means, for example by analyzing the feedstream for organic chlorides and free HCl using a gas chromatograph equipped with a Hall detector. The rate of mixing (and, hence, reaction) of the monomers and the HCl can be conveniently enhanced by use of an in-line static (kinetic) mixer in the feedstream conduit downstream of the HCl injection point. (Alternatively, or in addition, the HCl can be added to the $C_4$ feedstream prior to an in-line indirect heat exchanger to aid in mixing the HCl and the monomers prior to the reactor by means of the turbulence generated in passing therethough.) To further enhance the rate of mixing of the HCl and monomers, the mixture of the HCl and the $C_4$ feedstream is preferably maintained at a temperature of from at least about 5° C., e.g., from about 5 to 70° C.

Preferably, the organo-aluminum chloride catalyst is not admixed with the $C_4$ feedstream prior to, or during, the injection of the HCl (and preferably is not admixed with the $C_4$ monomer containing stream prior to the charging of the treated feedstream mixture into the reactor); otherwise uncontrolled, exothermic polymerization will be initiated unless extreme measures are taken (such as maintaining the admixture at a temperature below that which polymerization proceeds.) Of course, the extent of such undesired pre-polymerization will vary, depending on the residence time of the admixture outside of the reactor's reaction zone.

Therefore, the treated feedstream mixture, containing the $C_4$ monomers and the pre-reacted HCl, is preferably added (preferably continuously) to the reactor with organo-aluminum chloride catalyst being introduced into the reaction mixture through a separate inlet.

The process of this invention can be practiced in a batchwise, semi-continuous or (as is preferred) in a continuous manner. Preferably, the treated feedstream mixture, containing the $C_4$ monomers and the prereacted HCl, and the organo-aluminum chloride catalyst streams are added to the reaction zone substantially simultaneously, at a rate sufficient to maintain the selected ratio of the monomers and organo-aluminum catalyst in the liquid reaction mixture. However, it is also possible to add these streams in a stagewise manner to a liquid reaction mixture.

Polymerization occurs in an exothermic reaction by contacting the two incoming streams in a cooled reactor with reactor temperature, preferably maintained at about $-15°$ C. to $+15°$ C. For a continuous-type stirred reactor, average reactant residence time will generally be about 10 to 45 minutes. There will generally be employed 0.001 to 0.008 moles (preferably from about 0.002 to 0.006 moles) of organo-aluminum catalyst per mole of isobutylene charged in the feedstream and from about 25 to 300 ppm by weight (and preferably from about 50 to 150 ppm by weight) of HCl co-catalyst per part by weight of $C_4$ feedstream. Generally, the organo-aluminum chloride catalyst and HCl-cocatalyst will be employed in a ratio of from about 1 to 4 parts by weight, preferably from about 1.3 to 3 parts by weight, and more preferably from about 1.5 to 2.7 parts by weight, of the organo-aluminum chloride catalyst per part by weight of the HCl-cocatalyst (calculated as HCl).

The organo-aluminum chloride useful in the process of this invention comprises at least one compound of the formula (I)

$(R)_xAl(Cl)_{3-x}$ wherein R is $C_1$ to $C_{20}$ hydrocarbyl and x is an integer of from 1 to 2. R can comprise branched or straight chained alkyl, cycloalkyl, aryl, alkaryl, aralkyl, alkenyl, and alkynyl, and hydrocarbyl (e.g., $C_1$ to $C_{10}$) substituted derivatives thereof. When R is alkyl, the alkyl group can contain from 1 to 20, preferably from 1 to 10, and most preferably from 1 to 4, carbon atoms. Illustrative of such alkyl groups are methyl, ethyl, isopropyl, propyl, n-butyl, isobutyl, tertbutyl, pentyl, hexyl, heptyl, octyl, nonyl, decyl, dodecyl, tridecyl, tetradecyl, octadecyl and the like. When R is alkenyl, the alkenyl group can contain from 2 to 20, preferably from 2 to 10, and most preferably from 2 to 4, carbon atoms. Illustrative of such alkenyl groups ethenyl, isopropenyl, propenyl, n-butenyl, isobutenyl, tertbutenyl, pentenyl, hexenyl, heptenyl, octenyl, nonenyl, decenyl, dodecenyl, tridecenyl, tetradecenyl, octadecenyl and the like. When R is alkynyl, the alkynyl group can contain from 2 to 20, preferably from 2 to 10, and most preferably from 2 to 4, carbon atoms. Illustrative of such alkynyl groups are ethynyl, isopropynyl, propynyl, n-butynyl, isobutynyl, tertbutynyl, pentynyl, hexynyl, heptynyl, octynyl, nonynyl, decynyl, dodecynyl, tridecynyl, tetradecynyl, octadecynyl and the like. When R is aryl, the aryl group can contain from 6 to 10 carbon atoms. Illustrative of such aryl groups are phenyl, naphthyl and the like. When R is alkaryl, the alkaryl group can contain from 7 to 20, preferably from 7 to 15, and most preferably from 7 to 10, carbon atoms. Illustrative of such alkaryl groups are tolyl, xylyl, di(ethyl)phenyl, di(hexyl)phenyl, and the like. When R is aralkyl, the aralkyl group can contain from 7 to 20, preferably from 7 to 15, and most preferably from 7 to 10, carbon atoms. Illustrative of such aralkyl groups are benzyl, ethylbenzyl, phenylhexyl, naphthylhexyl, and the like. When R is cycloalkyl, the cycloalkyl group can contain from 3 to 20, preferably from 3 to 10, and most preferably from 3 to 4, carbon atoms. Illustrative of such cycloalkyl groups are cylcopropyl, cyclobutyl, cyclopentyl, cyclohexyl, cycloheptyl, cyclooctyl, cyclononyl, cyclodecyl, cyclododecyl, cyclotridecyl, cyclotetradecyl, cyclooctadecyl and the like. Illustrative of hydrocarbyl-substituted derivatives of the foregoing groups are 2-ethylcyclohexyl, cyclopropylphenyl, phenylcylohexyl, and the like.

Illustrative of useful organo-aluminum chlorides are $(CH_3)AlCl_2$, $(CH_3)_2AlCl$, $C_2H_5AlCl_2$, $(C_2H_5)_2AlCl$, $(CH_3)_2CHAlCl_2$, $[(CH_3)_2CH]_2AlCl$, $(C_3H_7)AlCl_2$, $(C_3H_7)_2AlCl$, $CH_3CH(CH_3)AlCl_2$, $[CH_3CH(CH_3)]_2AlCl$, $(CH_3)_3CAlCl$, $[(CH_3)_3C]_2AlCl$, $C_6H_{13}AlCl_2$, $C_5H_{11}AlCl_2$, $C_{10}H_{21}AlCl_2$, and mixtures thereof. Especially preferred are $C_2H_5AlCl_2$, $(C_2H_5)_2AlCl$ and mixtures thereof. Preferred are organo-aluminum chloride catalysts which are liquids under the reaction conditions.

The polybutene prepared in accordance with this invention generally contain an average of about 1 double bond per polymer chain and up to about 10 percent of the polymer chains may be saturated.

Referring now to FIG. 1 wherein one embodiment of the process of this invention is illustrated, a $C_4$ feedstream 2 is passed through a drying zone 10 for removal of water (e.g., using $CaCl_2$). The dried $C_4$ stream 11 is then passed through tubular heat exchanger 12 for cooling of the feedstream to the desired reaction temperature. HCl gas is introduced via conduit 4 into conduit 11 upstream of exchanger 12. The treated feedstream is then introduced via conduit 14 into reactor 20, the free HCl content of the thus-introduced feed 14 being as described above. Liquid organo-aluminum catalyst (e.g., ethyl aluminum dichloride) is introduced into reactor 20 via a separate conduit 18. A portion of the liquid reaction medium is withdrawn via conduit 22 and passed to external heat exchanger 30 via conduit 24 for cooling of the reaction liquid, and the cooled liquid is reintroduced to reactor 20 via conduit 26, to aid in reaction temperature control. Polymer reaction liquid is withdrawn from the reactor 20 via conduit 22 and passed to conduit 28 and introduced into a first water washing zone 40 (to which water is introduced via conduit 42) to quench the catalyst. The aqueous and organic layers are allowed to separate, and the upper aqueous layer is withdrawn via conduit 44. The washed organic layer containing the polymer is withdrawn via conduit 46 and passed to an aqueous caustic contacting zone 50 for further neutralization and removal of catalyst residues. Aqueous caustic is introduced via conduit 52, the separated aqueous layer is withdrawn via conduit 54, and the treated organic layer is passed from zone 50 to a second water washing zone 60, for contacting with additional water, introduced via conduit 62. A second aqueous stream 64 is removed and a second washed organic stream 60 containing the polymer which is preferably substantially free of the catalyst (e.g., as determined by a substantially neutral pH, and by an aluminum content of less than about 10 wppm Al) is withdrawn as stream 66.

Polymer stream 66 can then be passed to distillation zone 70 for removal of $C_4$'s (butanes and unreacted butenes) as an overhead product 72. The bottoms 74 can be passed to a second distillation zone 80 for removal of the light polymer fraction as an second overhead product 82. The resulting second bottoms stream 84 can then be passed to a third distillation zone 90 for removal of water therefrom as a third overhead product 92, if steam stripping is employed in a prior distillation, to form the polymer product stream 94.

It will be understood that reactor 20 and contacting zones 40, 50 and 60 can be provided with suitable agitators for mixing of the streams so contacted, and that the distillations in zones 70, 80 and 90 can be accomplished by means known to those skilled in the art, employing conventional distillation equipment and techniques. The process of this invention can be operated continuously, or on a batchwise or semi-continuous basis.

The polybutene prepared in accordance with this invention offers a number of advantages over polybutene prepared by prior art techniques with respect to those properties which are important for its use in making lubricating oil dispersant, typically in a form of the reaction product of polyisobutenyl succinic anhydride with polyamines or polyols.

The significant aspect is that the process of this invention permits a more precise control of polybutene production than heretofore possible. In lubricating oil dispersant technology it is known that a relatively higher molecular weight polybutene group provides dispersant additive exhibiting better engine performance in terms of sludge dispersancy and varnish deposit inhibition. However, conventional techniques for manufacturing polybutene have heretofore been somewhat unsatisfactory, since the viscosities of such relatively higher molecular weight materials increased proportional to the molecular weight, thereby causing a number of problems in both handling and manufacture of the dispersant products. These problems were due to the inherently broader molecular weight distribution of such products. Here, the present process offers the advantage of controlling molecular weight in that a narrow molecular weight distribution is obtained which, for a given molecular weight range, results in a material having a relatively lower viscosity. Molecular weight distribution of the product is less than 2, generally from about 1.80 to 1.95, and preferably about 1.85 to 1.90. Preferred polybutenes are those having an $\overline{M}_n$ of about 900 to 2,500.

In the process of the present invention, a high degree of reactor controllability is achieved and the target specification of molecular weight and molecular weight distribution which is desired can be met through monitoring and adjustment of incoming catalyst addition rate, such as the HCl addition rate relative to isobutene content, reactor temperature, residence time, feedstream introduction rate and the like. These parameters and the quality of the finished product can be monitored at close time intervals in the practice of the present invention. Thus, for a given polybutene molecular weight desired, process conditions can be defined which will direct the process toward the target product.

The process of this invention also provides a number of product quality improvements in the polybutene product which are carried over to the quality of the dispersant additive ultimately produced. It has been observed in accordance with this invention that ultra violet absorption values for the product are relatively lower than prior art product. These analyses have been considered a measure of instability in dispersant products, probably related to the presence of moieties other than polybutene. Also, the products prepared in accordance to the invention exhibit relatively lower chlorine level which is a distinct advantage since it does tend to minimize or eliminate expensive clay filtration techniques commonly used in order to meet maximum chlorine specification in polybutene-containing products.

Another advantage of the invention is a significant reduction in the quantity of so called "light ends" in the polybutene product. These are polybutenes in the undesirable $\overline{M}_n$ range of about 200 to 500. The process of this invention minimizes the quantity of these materials and the yield of desired product in the high molecular weight range increases accordingly. Products of this invention will generally contain less than about 35% by weight of such low molecular weight polybutenes in the reaction mixture prior to product finishing. After stripping of volatiles and light ends of $\overline{M}_n$ of less 300 and below, the finished product polybutene will contain less than 25% by weight of polybutene having an $\overline{M}_n$ below 500. The exact amount of acceptable low molecular weight polybutene will vary depending on product viscosity.

The technique of addition of HCl to the feedstream in the absence of organo-aluminum chloride to form a pre-reacted feedstream offers the further advantage of substantially reducing the presence of chlorinated polybutene in the finished product. When dispersant precursor, i.e., polybutene succinic anhydride, is made from polybutene, any products from the reaction of chlorinated polybutene are distinctly disadvantageous. Any polymerization process which permits free HCl to exist in the reactor has this problem and the present invention successfully avoids it through use of the pre-reacted feedstream.

In the present invention, HCl injected into the feedstream reacts quickly with isobutylene to produce t-butyl chloride which, upon entering the reactor, functions as a co-catalyst with organo-aluminum chloride to initiate the polymerization, the organo-aluminum chloride reacting with the t-butyl chloride to form ethyl aluminum trichloride and a t-butyl cation and thereby initiating polymerization. In contrast to this, when HCl is used to promote organo-aluminum chloride, the species H+EtAlCl$_3$ which is formed by reaction between HCl and organo-aluminum chloride initiates the polymerization. Polymerization in accordance with the present invention is more efficient and provides a degree of process control and product quality not obtainable with prior art procedures based upon the use of organo-aluminum chloride and HCl.

Polybutenes prepared in accordance with this invention are particularly useful as a feedstock for the production of improved lubricating oil additives, including dispersants. One class of useful additive are the polybutene-substituted mono- and dicarboxylic acids, anhydrides and esters which can be made by reaction of the polybutene with a monounsaturated mono- or dicarboxylic acid, anhydride or ester. Such materials can be made by conventional methods wherein with a monounsaturated carboxylic reactant comprising at least one member selected from the group consisting of (i) monounsaturated $C_4$ to $C_{10}$ dicarboxylic acid (preferably wherein (a) the carboxyl groups are vicinyl, (i.e. located on adjacent carbon atoms) and (b) at least one, preferably both, of said adjacent carbon atoms are part of said mono unsaturation); (ii) derivatives of (i) such as anhydrides or $C_1$ to $C_5$ alcohol derived mono- or di-esters of (i); (iii) monounsaturated $C_3$ to $C_{10}$ monocarboxylic acid wherein the carbon-carbon double bond is conjugated to the carboxy group, i.e., of the structure

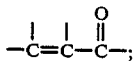

and (iv) derivatives of (iii) such as $C_1$ to $C_5$ alcohol derived monoesters of (iii). Upon reaction with the polybutene, the monounsaturation of the monounsaturated carboxylic reactant becomes saturated. Thus, for example, maleic anhydride becomes a polybutene substituted succinic anhydride, and acrylic acid becomes a polybutene substituted propionic acid.

Typically, from about 0.7 to about 4.0 (e.g., 0.8 to 2.6), preferably from about 1.0 to about 2.0, and most preferably from about 1.1 to about 1.7 moles of said monounsaturated carboxylic reactant are charged to the reactor per mole of polybutene charged.

Normally, not all of the polybutene reacts with the monounsaturated carboxylic reactant and the reaction mixture will contain unfunctionalized polybutene. The unfunctionalized polybutene is typically not removed from the reaction mixture (because such removal is difficult and would be commercially infeasible) and the product mixture, stripped of any monounsaturated carboxylic reactant is employed for further reaction with the amine or alcohol as described hereinafter to make the dispersant.

Characterization of the average number of moles of monounsaturated carboxylic reactant which have reacted per mole of polybutene charged to the reaction (whether it has undergone reaction or not) is defined herein as functionality. Said functionality is based upon (i) determination of the saponification number of the resulting product mixture using potassium hydroxide; and (ii) the number average molecular weight of the polybutene charged, using techniques well known in the art. Functionality is defined solely with reference to the resulting product mixture. Although the amount of said unfunctionalized polybutene contained in the resulting product mixture can be subsequently modified, i.e. increased or decreased by techniques known in the art, such modifications do not alter functionality as defined above. The terms "polybutene substituted monocarboxylic acid material" and "polybutene substituted dicarboxylic acid material" as used herein are intended to refer to the product mixture whether it has undergone such modification or not.

Accordingly, the functionality of the polybutene substituted mono- and dicarboxylic acid material will be typically at least about 0.5, preferably at least about 0.7, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, etc.

The polybutene can b e reacted with the monounsaturated carboxylic reactant by a variety of methods. For example, the polybutene can be first halogenated, chlorinated or brominated to about 1 to 8 wt. %, preferably 3 to 7 wt. % chlorine, or bromine, based on the weight of polybutene, by passing the chlorine or bromine through the polybutene at a temperature of 60 to 250 ° C., preferably 110 to 160° C., e.g. 120 to 140° C., for about 0.5 to 10, preferably 1 to 7 hours. The halogenated polybutene may then be reacted with sufficient monounsaturated carboxylic reactant at 100 to 250° C., usually about 180° to 235° C., for about 0.5 to 10, e.g. 3 to 8 hours, so the product obtained will contain the desired number of moles of the monounsaturated carboxylic reactant per mole of the halogenated polybutene. Processes of this general type are taught in U.S. Pat. Nos. 3,087,436; 3,172,892; 3,272,746 and others. Alternatively, the polybutene and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

Alternately, the polybutene and the monounsaturated carboxylic reactant can be contacted at elevated temperature to cause a thermal "ene" reaction to take place. Thermal "ene" reactions have been heretofore described in U.S. Pat. Nos. 3,361,673 and 3,401,118, the disclosures of which are hereby incorporated by reference in their entirety.

Preferably, the polybutenes used in this invention contain less than 5 wt%, more preferably less than 2 wt%, and most preferably less than 1 wt% of a polybutene fraction comprising polybutene molecules having a molecular weight of less than about 300, as determined by high temperature gel permeation chromatography employing the corresponding polybutene calibration curve. Such preferred polybutenes have been found to permit the preparation of reaction products, particularly when employing maleic anhydride as the unsaturated acid reactant, with decreased sediment. In the event the polybutene produced as described above contains greater than about 5 wt% of such a low molecular weight polybutene fraction, the polybutene can be first treated by conventional means to remove the low molecular weight fraction to the desired level prior to initiating the ene reaction, and preferably prior to contacting the polybutene with the selected unsaturated carboxylic reactant(s). For example, the polybutene can be heated, preferably with inert gas (e.g., nitrogen) stripping, at elevated temperature under a reduced pressure to volatilize the low molecular weight polybutene components which can then be removed from the heat treatment vessel. The precise temperature, pressure and time for such heat treatment can vary widely depending on such factors as as the polybutene number average molecular weight, the amount of the low molecular weight fraction to be removed and other factors. Generally, a temperature of from about 60 to 250° C. and a pressure of from about 0.1 to 1.0 atmospheres and a time of from about 0.5 to 20 hours (e.g., 2 to 8 hours) will be sufficient.

In this process, the selected polybutene and monounsaturated carboxylic reactant and halogen (e.g., clhorine gas), where employed, are contacted for a time and under conditions effective to form the desired polybutene substituted mono- or dicarboxylic acid material. Generally, the polybutene and monounsaturated carboxylic reactant will be contacted in a polybutene to unsaturated carboxylic reactant mole ratio usually from about 1:1 to 1:10, and preferably from about 1:1 to 1:5, at an elevated temperature, generally from about 120 to 260° C., preferably from about 160 to 240° C. The mole ratio of halogen to monounsaturated carboxylic reactant charged will also vary and will generally range from about 0.5:1 to 4:1, and more typically from about 0.7:1 to 2:1 (e.g., from about 0.9 to stirring for a time of from about 1 to 20 hours, preferably from about 2 to 6 hours.

By the use of halogen, about 65 to 95 wt. % of the polybutene will normally react with the monounsaturated carboxylic acid reactant. Upon carrying out a thermal reaction without the use of halogen or a catalyst, then usually only about 50 to 75 wt. % of the polybutene will react. Chlorination helps increase the reactivity.

If desired, a catalyst or promoter for reaction of the polybutene and monounsaturated carboxylic reactant (whether the polybutene and monounsaturated carboxylic reactant are contacted in the presence or absence of halogen (e.g., chlorine)) can be employed in the reaction zone. Such catalyst of promoters include alkoxides of Ti, Zr, V and Al, and nickel salts (e.g., Ni acetoacetonate and Ni iodide) which catalysts or promoters will be generally employed in an amount of from about 1 to 5,000 ppm by weight, based on the mass of the reaction medium.

The reaction is preferably conducted in the substantial absence of $O_2$ and water (to avoid competing side reactions), and to this end can be conducted in an atmosphere of dry $N_2$ gas or other gas inert under the reaction conditions. The reactants can be charged separately or together as a mixture to the reaction zone, and the reaction can be carried out continuously, semi-continuously or batchwise. Although not generally necessary, the reaction can be carried out in the presence of a liquid diluent or solvent, e.g., a hydrocarbon diluent such as mineral lubricating oil, toluene, xylene, dichlorobenzene and the like. The polybutene substituted mono- or dicarboxylic acid material thus formed can be recovered from the liquid reaction mixture, e.g., after stripping the reaction mixture, if desired, with an inert gas such as $N_2$ to remove unreacted unsaturated carboxylic reactant.

Dispersants generally comprise the reaction product of polybutenyl succinic anhydride or the acid form thereof with monoamines or polyamines having up to about 30 carbon atoms, having at least one primary or secondary amino group such as the alkylene polyamines, particularly the ethylene polyamines, the polyoxyalkylene amines, aromatic and cycloaliphatic amines, hydroxyamines, mono-aliphatic and di-aliphatic substituted amines. Useful dispersants are also formed by reacting monohydric and polyhydric alcohols with the polybutenyl succinic anhydride or diacid provided from the polybutenes made in accordance with this invention and preferred materials are thus derived from polyols having 2 to 6 OH groups containing up to about 20 carbon atoms such as the alkane polyols and alkylene glycols. Also suitable are the polyoxyalkylene alcohols such a polyoxyethylene alcohols and polyoxypropylene alcohols, monohydric and polyhydric phenols and naphthols, ether alcohols and amino alcohols and the like. Borated derivatives of the foregoing dispersants are also useful, especially borated nitrogen containing dispersants resulting from boration with boron oxide, boron halide, boron acids and esters to provide 0.2 to 2.0 wt. 5 boron in the dispersant. Metals and metal-containing compounds can also form useful dispersants and these are compounds capable of forming salts with the polyisobutenyl succinic anhydride or acid of the present invention and this includes metals such as the alkali metals, alkaline earth metals, zinc, cadmium, lead, cobalt, nickel, copper, iron, chromium, magnesium and derivatives thereof such as oxides, carboxylates, halides, phosphates, sulfates, carbonates, hydroxides and the like.

Also useful are Mannich Base condensate dispersants wherein the polybutenes of this invention are reacted with a hydroxy-substituted aromatic compound (e.g. phenol) in an alkylation reaction to form a polybutene-substituted hydroxyaromatic compound. This polybutene-substituted hydroxyaromatic compound can then be condensed in a Mannich Base reaction with an amine (e.g., any of the mono- or polyamines described above) and an aldehyde (e.g., formaldehyde). Such alkylation and Mannich Base reactions can be accomplished using any of the conventional alkylation and Mannich Base condensation methods.

Lubricating oil compositions will usually contain dispersants in amounts of from about 1 to 15 wt. % based on the overall weight of the composition. Lubricating oil compositions will typically contain other additives in customary amounts to provide their normal attendant functions such as metal detergents or basic metal detergent, anti-wear additives, anti-oxidants, viscosity modifiers and the like. Dispersants are conveniently packaged and dispensed in the form of solution concentrates containing about 20 to 50 wt. % dispersant in mineral oils.

The invention is further illustrated by the following examples (wherein parts are by weight unless otherwise indicated) which ar not to be considered as limitative of its scope.

EXAMPLE 1

A liquid $C_4$ feedstream composed of 38 wt.% isobutene, 30 wt.% butene-1,4 wt.% isobutane, 10 wt.% n-butane, 18 wt.% butene-1 and less than 0.2% butadiene was dried with $CaCl_2$ and then introduced into a reactor feed line. The moisture content in the feed after drying was less than 40 ppm. Anhydrous gaseous HCl was introduced into the feed line in advance of the reactor entry point to form a treated feedstream. The amount of HCl introduced into the feed line was in the range of 50 to 190 ppm by weight with average of about 74 ppm HCl by weight. Analysis of the treated feedstream showed it to contain less than 0.1 ppm free HCl and showed that t-butylchloride was the major organo-chloride in the treated feedstream, which was found to have an overall organo-chloride concentration of 80 ppm to 280 ppm by weight. The treated feedstream was added to a continuous stirred reactor at a rate of about 13.4 cubic meters per hour. The reactor residence time was maintained at about 30 minutes, the reactor pressure was maintained at about 2.1 Bar, and the reactor temperature was maintained at about 5° C. Ethylaluminum dichloride (EADC) was simultaneously added as a 15 wt% solution in ISOPAR ® L, an inert hydrocarbon solvent, to provide an amount of EADC equal to 0.023 wt.% of the $C_4$ feedstream. Reaction product was withdrawn at a rate corresponding to the total feed introduction rate. The polymerization reaction mixture was withdrawn from the reactor and the catalyst removed by the steps of water washing and aqueous caustic treatment of the washed organic layer. A caustic treated organic layer was then obtained which was subjected to a second water washing step. The washed organic product was then stripped of unreacted $C_4$ hydrocarbons and oligomers less than $\overline{M}_n=300$ to form a finished polybutene product containing less than 25 wt.% of polybutene of $\overline{M}_n=500$ or less.

97% of isobutene was found converted to polybutene, and less than 0.1 ppm of free HCl remained in the reactor vapor phase. The finished product polybutene was found to have a number average molecular weight of about 1300, an average viscosity of 580 to 640 cSt at 100° C. and a molecular weight distribution of about 1.80 to 1.90. The stripped light oligomer was about 8 wt.% of the total finished polybutene product. The residue chlorine in the finished polybutene product was found to be about 50 ppm.

EXAMPLE 2

The procedure of Example 1 was repeated except that amount of HCl introduced into the feed line was in the range of 150 to 220 ppm by weight with average of about 190 ppm HCl by weight. Analysis of the treated feedstream showed it to contain less than 0.1 ppm free HCl and showed that t-butylchloride was the major organo-chloride in the treated feedstream which was found to have an overall organo-chloride concentration of 190 ppm to 320 ppm. The reactor temperature was maintained at about 10° C., the reactor pressure was maintained at about 2.1 Bar, and the reactor residence time was maintained at about 30 minutes. The EADC solution was added to provide an amount of EADC equal to 0.030 wt.% of the $C_4$ feedstream. 98% of isobutene was found to be converted to polybutene, and less than 0.1 ppm of free HCl remained in the reactor vapor phase. The finished product polybutene was found to have a number average molecular weight of about 950, an average viscosity of 190 to 240 cSt at 100° C., and a molecular weight distribution of about 1.80 to 1.90. The residue chlorine in the finished polybutene was found to be about 70 ppm.

COMPARATIVE EXAMPLES 3–5

The procedure of Example 1 was repeated except that the catalyst comprised finely divided $AlCl_3$ rather than EADC, using the run conditions described in Table I below.

TABLE I

|  | Comparative Example 3 | Comparative Example 4 | Comparative Example 5 |
|---|---|---|---|
| Reactor temp. °C. | 1 to 3 | 5 | 0 to −2 |
| Wt. % $AlCl_3$ in feed | .08–.67 | .08–.67 | .08–.67 |
| HCl cocat, ppm in feed | 150 | 100–200 | 70 |
| Isobutene conver. | 99 |  | 98 |
| Mol. wt., $\overline{M}_n$ | 1300 | 900 | ~950 |
| Mol. wt. distr. ($\overline{M}_w/\overline{M}_n$) | 1.90–1.95 | 1.90–1.95 | 1.90–1.95 |
| Residue chlorine, ppm | ~100 | ~100 | ~100 |
| Viscosity, cSt at 100° C. | 590–640 | 210 | 190–247 |

Note: Feeds for Comp. Examples 3, 4 and 5;

| Component (wt. %) | Comp. Exs. 3 and 4 | Comp. Ex. 5 |
|---|---|---|
| isobutene | 23 | 15–22 |
| butene-1 | 22 | 15–22 |
| saturated butanes | 55 | — |
| isobutane | — | 45–55 |
| n-butane | — | 6–8 |
| butadiene | ≤0.2 | ≤0.2 |
| Total | 100 | 100 |

COMPARATIVE EXAMPLES 6–7

The procedure of Example 1 is repeated except that water, rather than HCl, was employed as co-catalyst. The conditions of the reaction are described in Table II.

TABLE II

|  | Comparative Example 6 | Comparative Example 7 |
|---|---|---|
| reactor temp. °C. | 10 | 10 |
| wt. % EADC in feed | 0.085 | 0.082 |
| $H_2O$ cocat, ppm in feed | 135 | 100 |
| isobutene conver., % | 93.6 | 86.6 |
| mol. wt. distr. ($\overline{M}_w/\overline{M}_n$) | ~2.1 | ~2.3 |
| residue chlorine, ppm | 56 | 56 |
| $\overline{M}_n$ | 1238 | 2049 |

Note:
Feed rate  12 $M^3$/hr.
Reactor pressure  2.0 Bar
Residence time  about 30 minutes
Catalyst added as a 15% EaDC solution in ISOPAR ®-L solvent.

The above data illustrate the simultaneous improved low chlorine residual concentrations and narrower molecular weight distributions achieved by the process of the present invention over those achieved by use of the $AlCl_3$/HCl catalyst/co-catalyst system when compared at the same number average molecular weight product, and these data further illustrate the improved molecular weight distribution achieved by the present process compared to an EADC/water catalyst/co-catalyst system.

Generally the polybutene products produced by the process of this invention will contain less than about 100 wppm, preferably less than about 75 wppm, and most preferably less than about 60 wppm chlorine (as Cl).

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for preparing low molecular weight polybutene having an $\overline{M}_n$ in the range of about 700 to about 3,000 and a molecular weight distribution of about 1.80 to 1.90 from a feedstream mixture of $C_4$ hydrocarbons containing at least about 6% by weight isobutylene in a stirred reaction zone maintained at a temperature of about −50° C. to +30° C. in the presence of organo-aluminum chloride catalyst, which comprises:

(a) injecting HCl in an amount of from about 25 to 300 parts by weight per one million parts by weight of said feedstream mixture into said feedstream mixture, in the substantial absence of said organo-aluminum chloride catalyst and under conditions sufficient to substantially completely react said injected HCl with isobutylene, thereby producing a treated feedstream mixture which contains less than 1.0 ppm free HCl;

(b) simultaneously introducing said treated feedstream mixture and said organo-aluminum chloride catalyst as separate streams into said reaction zone;

(c) contacting said introduced treated feedstream mixture and said introduced catalyst in the reaction zone for a time and under conditions sufficient to form a polymerization reaction mixture containing said polybutene;

(d) withdrawing said polymerization reaction mixture from said reaction zone; and (e) recovering said polybutene product from said withdrawn polymerization reaction mixture.

2. The process of claim 1 wherein said catalyst comprises at least one member selected from the group consisting of compounds of the formula:

$$(R)_x Al(Cl)_{3-x}$$

wherein R is $C_1$ to $C_{20}$ hydrocarbyl and x is an integer of from 1 to 2.

3. The process of claim 2 wherein said R group comprises branched or straight chained alkyl having from 1 to 10 carbon atoms.

4. The process of claim 3 wherein said R group comprises $C_1$ to $C_4$ alkyl.

5. The process of claim 4 wherein said alkyl group comprises at least one member selected from the group consisting of methyl, ethyl, isopropyl, propyl, n-butyl, isobutyl, and tert-butyl.

6. The process of claim 1 wherein said catalyst comprises at least one member selected from the group consisting of $(CH_3)AlCl_2$, $(CH_3)_2AlCl$, $C_2H_5AlCl_2$, $(C_2H_5)_2AlCl$, $(CH_3)_2CHAlCl_2$, $[(CH_3)_2CH]_2AlCl$, $(C_3H_7)AlCl_2$, $(C_3H_7)_2AlCl$, $CH_3CH(CH_3)AlCl_2$, $[CH_3CH(CH_3)]_2AlCl$, $(CH_3)_3CAlCl$, $[(CH_3)_3C]_2AlCl$, $C_6H_{13}AlCl_2$, $C_5H_{11}AlCl_2$, and $C_{10}H_{21}AlCl_2$.

7. The process of claim 1 wherein said catalyst comprises $C_2H_5AlCl_2$, $(C_2H_5)_2AlCl$ and mixtures thereof.

8. The process of claim 1 wherein there is employed 0.001 to 0.008 moles of ethyl aluminum dichloride catalyst per mole of said isobutylene.

9. The process of claim 1 wherein the temperature range is about $-15°$ C. to $+15°$ C.

10. The process of claim 1 wherein the polybutene has an $\overline{M}_n$ of about 900 to about 2,500.

11. The process of claim 8 wherein the ethyl aluminum dichloride catalyst is added in an amount of from about 0.002 to 0.006 moles per mole of said isobutylene.

12. The process of claim 1 wherein the ethyl aluminum dichloride and HCl are added in a wt:wt ratio of from about 1 to 4.

13. The process of claim 1 wherein said reaction is effected in a stirred tank reactor.

14. The process of claim 1 wherein said reaction is effected in a tubular reactor.

15. A continuous process for preparing low molecular weight polybutene having an $\overline{M}_n$ in the range of about 700 to about 3,000 and a molecular weight distribution of about 1.80 to 1.90 from a feedstream mixture of $C_4$ hydrocarbons containing at least about 6% by weight isobutylene in a stirred reaction zone maintained at a temperature of about $-15°$ C. to $+15°$ C. in the presence of organo-aluminum chloride catalyst, which comprises:

(a) injecting HCl in an amount of from about 25 to 300 parts by weight per one million parts by weight of said feedstream mixture into said feedstream mixture, in the substantial absence of said organo-aluminum chloride catalyst and under conditions sufficient to substantially completely react said injected HCl with isobutylene, thereby producing a treated feedstream mixture which contains less than 1.0 ppm free HCl;

(b) simultaneously introducing said treated feedstream mixture and said organo-aluminum chloride catalyst as separate streams into said reaction zone;

(c) contacting said introduced treated feedstream mixture and said introduced catalyst in the reaction zone for a time and under conditions sufficient to form a polymerization reaction mixture containing said polybutene;

(d) continuously withdrawing said polymerization reaction mixture from said reaction zone; and (e) recovering said polybutene product from said withdrawn polymerization reaction mixture.

16. The process of claim 15 wherein said withdrawn polymerization reaction mixture is quenched with aqueous alkali and said polybutene product is recovered from said quenched polymerization reaction mixture.

17. The process of claim 15 wherein said catalyst comprises at least one member selected from the group consisting of compounds of the formula:

$$(R)_x Al(Cl)_{3-x}$$

wherein R is $C_1$ to $C_{20}$ hydrocarbyl and x is an integer of from 1 to 2.

18. The process of claim 17 wherein said R group comprises branched or straight chained alkyl having from 1 to 10 carbon atoms.

19. The process of claim 18 wherein said R group comprises $C_1$ to $C_4$ alkyl.

20. The process of claim 19 wherein said alkyl group comprises at least one member selected from the group consisting of methyl, ethyl, isopropyl, propyl, n-butyl, isobutyl, and tert-butyl.

21. The process of claim 15 wherein said catalyst comprises at least one member selected from the group consisting of $(CH_3)AlCl_2$, $(CH_3)_2AlCl$, $C_2H_5AlCl_2$, $(C_2H_5)_2AlCl$, $(CH_3)_2CHAlCl_2$, $[(CH_3)_2CH]_2AlCl$, $(C_3H_7)AlCl_2$, $(C_3H_7)_2AlCl$, $CH_3CH(CH_3)AlCl_2$, $[CH_3CH(CH_3)]_2AlCl$, $(CH_3)_3CAlCl$, $[(CH_3)_3C]_2AlCl$, $C_6H_{13}AlCl_2$, $C_5H_{11}AlCl_2$, and $C_{10}H_{21}AlCl_2$.

22. The process of claim 16 wherein said catalyst comprises $C_2H_5AlCl_2$, $(C_2H_5)_2AlCl$ and mixtures thereof.

23. The process of claim 15 wherein the organo-aluminum catalyst is introduced into said reaction zone in an amount of from about 0.001 to 0.008 moles per mole of said isobutylene.

24. The process of claim 15 wherein the polybutene product has a viscosity of 190 to 250 centistokes at 100° C.

25. The process of claim 15 wherein the polymerization temperature is from about $-5°$ C. to $+15°$ C.

26. The process of claim 15 wherein the polybutene has an $\overline{M}_n$ of about 900 to about 2,500.

27. The process of claim 15 wherein the organo-aluminum chloride is added in admixture with $C_4$ hydrocarbons.

28. The process of claim 18 wherein the organo-aluminum chloride catalyst comprises a member selected from the group consisting of $(alkyl)_x$ aluminum $(chloride)_{3-x}$, wherein the alkyl group contains from 1 to 4 carbon atoms, and x is an integer of from 1 to 2.

29. The process of claim 15 wherein the organo-aluminum chloride catalyst comprises ethyl aluminum dichloride.

30. The process of claim 29 wherein said ethyl aluminum dichloride is added in admixture with $C_4$ hydrocarbons.

31. The process of claim 30 wherein the polymerization temperature is from about −5° C. to +15° C.

32. The process of claim 31 wherein the polybutene has an $\overline{M}_n$ of about 900 to 2,500.

33. The process of claim 32 wherein said ethyl aluminum dichloride catalyst is introduced into said reaction zone in an amount of from about 0.002 to 0.006 moles per mole of said isobutylene.

34. The process of claim 33 wherein the polybutene product has a molecular weight distribution of about 1.80 to 1.90.

35. The process of claim 33 wherein said withdrawn polymerization reaction mixture is quenched with aqueous alkali and said polybutene product is recovered from said quenched polymerization reaction mixture.

36. The product produced by the process of claim 1.

* * * * *